Patented July 12, 1932

1,866,852

UNITED STATES PATENT OFFICE

CARL NELSON HAND AND GEORGE LESTER MAGOUN, OF NITRO, WEST VIRGINIA, ASSIGNORS TO THE RUBBER SERVICE LABORATORIES CO., OF AKRON, OHIO, A CORPORATION OF OHIO

MANUFACTURE OF TRIARYL PHOSPHATES

No Drawing.    Application filed April 5, 1929.    Serial No. 352,907.

This invention relates to the manufacture of a triaryl phosphate and has for its object to provide an improved process whereby such esters may be produced in a state of high purity and in an economical and efficient manner. More particularly, the present invention relates to certain improvements in the preparation and purification of triphenyl phosphate as hereinafter disclosed. The invention will be fully understood from the following example of one preferred procedure.

Substantially three molar portions of phenol and somewhat more than one molar portion of phosphorus oxychloride were heated in a reactor. The resulting crude triphenyl phosphate was isolated by distillation of the reaction product at a pressure below atmospheric pressure. The lower boiling fraction distilling below substantially 230° C. at a pressure of approximately 70 m. m. of mercury and comprising mainly phenol and mono and diphenyl phosphates was returned to the reactor containing the next charge of material for the preparation of triphenyl phosphate.

The higher boiling fraction of the crude product distilling between substantially 230° C. and 310° C. at a pressure of approximately 70 m. m. of mercury, constituting the crude triphenyl phosphate was washed with a weak alkaline solution, as for example an approximately 5% caustic soda solution, and preferably at a temperature of substantially 45° to 50° C., in order to remove the last traces of unreacted phenol, after which the triphenyl phosphate was separated and washed with water to eliminate any occluded caustic solution.

The partially purified triphenyl phosphate was dissolved in an alcohol such as ethyl alcohol and, if convenient or desirable, filter cel or other similar diatomaceous or infusorial earths and/or decolorizing charcoal and the like may be added thereto and the suspension filtered. The triphenyl phosphate may be crystallized from this alcoholic solution and a fair grade of material obtained. If, however, a product of an exceptionally high quality is required, as for example for use as a plasticizing agent, other purification must be effected.

It has now been found that when water is added to a solution of a triaryl phosphate, for example triphenyl phosphate, dissolved in an alcoholic solution containing from 90 to 95% alcohol, a separation of the solution takes place. A similar separation of the solution into two distinct layers occurs when a triaryl phosphate, particularly triphenyl phosphate, is dissolved in an alcoholic solution of lower alcoholic content, for example a solution containing from about 64 to 75% and preferably from 70 to 73% alcohol. The upper and larger layer comprises a solution of triphenyl phosphate in alcohol and water and the lower and smaller layer comprises a solution of alcohol in triphenyl phosphate. It has been further found that the lower layer contains all the dirt or foreign occluded matter, while the upper layer is clean and colorless. From this upper layer a high grade of triphenyl phosphate is obtained on crystallization.

As a specific example of the preferred method of purification of triphenyl phosphate, the following is given.

Substantially 180 parts of triphenyl phosphate (calculated on a dry basis), resulting from treating the crude product with caustic and washing with water as described, was dissolved in about 200 parts of substantially 93% alcohol, for example ethyl alcohol, and approximately 50 to 90 parts of water added to effect separation. The upper or clear layer was separated and the triphenyl phosphate crystallized therefrom. The lower layer was then again treated with approximately 200 parts of substantially 93% ethyl alcohol and preferably 50 to 90 parts of water added to effect a separation of the liquid into two layers, as hereinbefore described. The upper layer formed by this treatment was separated and allowed to crystallize. The lower layer may be further treated as stated above in order to obtain additional triphenyl phosphate, or preferably the next lot of triphenyl phosphate which has been washed with caustic solution and water is added thereto and alcohol and water added as hereinbefore stated.

If convenient or desirable, in place of the successive treatment of the alkali and water washed triphenyl phosphate with alcohol and water or dilute alcohol, a larger quantity of alcohol and water or dilute alcohol is added thereto and only one treatment given. Thus, to substantially 180 parts of dry triphenyl phosphate resulting preferably from treating the crude product with caustic solution and washing with water, substantially 400 parts of approximately 93% ethyl alcohol and approximately 100 to 180 parts of water are added to effect separation. The isolation of the triphenyl phosphate is then carried out as hereinbefore stated.

The triphenyl phosphate prepared according to the preferred process forms a clear solution when a quantity, for example approximately 10 parts by weight, are dissolved in approximately 40 parts by weight of substantially 95% ethyl alcohol. Furthermore, ten grams of this material prepared as described did not decolorize 10 c. c. of N/100 potassium permanganate in forty-five minutes and had a corrected melting point of substantially 50.0 to 50.2° C.

As another mode of operating the present invention, water is added to a triaryl phosphate, for example triphenyl phosphate and an alcohol, such as ethyl alcohol added thereto until the alcohol constitutes substantially 64 to 77% of the total alcohol and water added. The separation and isolation of the triphenyl phosphate was carried out as described in the former example.

Again, if desirable, an alcohol such as ethyl alcohol of relatively weak strength may first be added to the triaryl phosphate, for example triphenyl phosphate, and a sufficient quantity of more concentrated alcohol added thereto until the required alcoholic concentration has been obtained, whereupon separation and isolation of the desired product is carried out in the manner hereinbefore described.

As a further mode of operating the present invention, an alcohol, such as ethyl alcohol, of the preferred strength for example substantially 64 to 77% may be added to a triaryl phosphate, for example triphenyl phosphate, and separation and isolation of the desired material effected in the manner described without the addition of more alcohol or water.

It has further been discovered that lower strengths of alcohol than that described may be employed in the operation of this invention. This, however, entails loss of efficiency as the amount of triaryl phosphate present in the upper or alcohol-water layer decreases with the amount of water contained therein.

Other triaryl phosphates, for example tricresyl phosphate, may be prepared and purified in an analogous manner to that hereinbefore described.

The invention described is not limited to the exact temperatures, proportions and the like hereinbefore set forth, but is limited solely by the claims attached hereto as part of this specification.

What is claimed is:

1. In the purification of a triaryl phosphate prepared by the reaction of a phenol with phosphorus oxychloride, the steps comprising adding dilute alcohol thereto, separating the upper layer formed thereby and allowing the triaryl phosphate to crystallize therefrom.

2. In the purification of a triaryl phosphate prepared by the reaction of a phenol with phosphorus oxychloride, the steps comprising the addition of a solution containing substantially 64 to 75% ethyl alcohol thereto, separating the upper layer formed thereby and allowing the triaryl phosphate to crystallize therefrom.

3. In the purification of triphenyl phosphate prepared by the reaction of phenol with phosphorus oxychloride, the steps comprising the addition of a solution containing substantially 70 to 73% ethyl alcohol thereto, separating the upper layer formed thereby and allowing the triphenyl phosphate to crystallize therefrom.

4. In the purification of a triaryl phosphate prepared by the reaction of a phenol with phosphorus oxychloride, the steps comprising the addition of an alkaline solution thereto, washing with water, adding dilute alcohol thereto, separating the upper layer formed thereby and allowing the triaryl phosphate to crystallize therefrom.

5. In the purification of a triaryl phosphate prepared by the reaction of phenol phosphorus oxychloride, the steps comprising the addition of an alkaline solution thereto, washing with water, adding a solution containing substantially 64 to 75% ethyl alcohol thereto, separating the upper layer formed thereby and allowing the triaryl phosphate to crystallize therefrom.

6. In the purification of a triaryl phosphate prepared by the reaction of a phenol with phosphorus oxychloride, the steps comprising the addition of an alkaline solution thereto, washing with water, adding a solution containing substantially 70 to 73% ethyl alcohol thereto, separating the upper layer formed thereby and allowing the triaryl phosphate to crystallize therefrom.

7. In the purification of triphenyl phosphate prepared by the reaction of phenol with phosphorus oxychloride, the steps comprising the addition of an alkaline solution thereto, washing with water, adding thereto a solution containing substantially 70 to 73% ethyl alcohol, separating the upper layer formed thereby and allowing the triphenyl phosphate to crystallize therefrom.

8. In the purification of a triaryl phosphate prepared by the reaction of a phenol with phosphorus oxychloride, the steps comprising the addition of alcohol and water thereto, separating the upper layer formed thereby and allowing the triaryl phosphate to crystallize therefrom.

9. In the purification of a triaryl phosphate prepared by the reaction of a phenol with phosphorus oxychloride, the steps comprising the addition of alcohol and sufficient water thereto to thereby form an alcohol of substantially 64 to 75% strength, separating the upper layer formed thereby and allowing the triaryl phosphate to crystallize therefrom.

10. In the purification of a triaryl phosphate prepared by the reaction of a phenol with phosphorus oxychloride, the steps comprising the addition of alcohol and sufficient water thereto to form an alcohol of substantially 70 to 73% strength, separating the upper layer formed thereby and allowing the triaryl phosphate to crystallize therefrom.

11. In the purification of triphenyl phosphate prepared by the reaction of phenal with phosphorus oxychloride, the steps comprising the addition of ethyl alcohol and sufficient water thereto to form an alcohol of substantially 70 to 73% strength, separating the upper layer formed thereby and crystallizing and isolating the triphenyl phosphate therefrom.

12. In the purification of triphenyl phosphate prepared by the reaction of phenol with phosphorus oxychloride, the steps comprising the addition of an alkaline solution thereto, washing with water then adding alcohol and sufficient water to form thereby an alcohol of substantially 64 to 75% strength, separating the upper layer formed and crystallizing and isolating the triphenyl phosphate.

13. In the purification of triphenyl phosphate prepared by the reaction of phenol with phosphorus oxychloride, the steps comprising the addition of an alkaline solution thereto, washing with water, then adding alcohol and sufficient water to form thereby an alcohol of substantially 70 to 73% strength, separating the upper layer formed and crystallizing and isolating the triphenyl phosphate.

In testimony whereof we hereunto affix our signatures.

CARL NELSON HAND.
GEORGE LESTER MAGOUN.